Nov. 13, 1951 K. C. CLARK 2,574,465
TIRE-WHEEL OR TIRE-RIM CARRIER FOR PICKUP TRUCKS
Filed Nov. 17, 1947 4 Sheets-Sheet 1
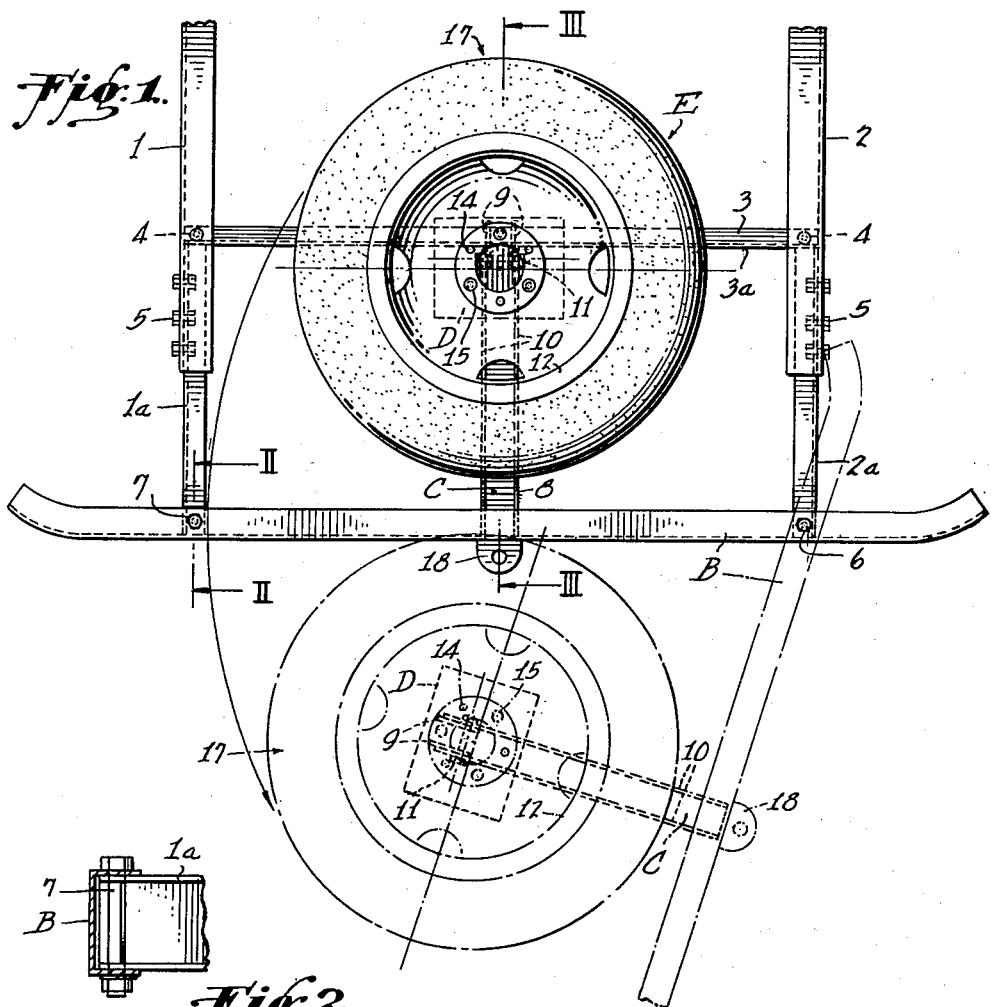
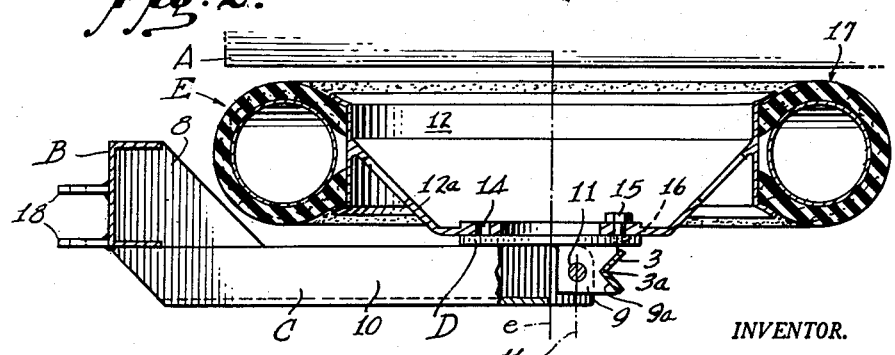
INVENTOR.
KENNETH C. CLARK
BY
Munn, Liddy & Glaccum
ATTORNEYS Nov. 13, 1951     K. C. CLARK     2,574,465
TIRE-WHEEL OR TIRE-RIM CARRIER FOR PICKUP TRUCKS
Filed Nov. 17, 1947     4 Sheets-Sheet 2
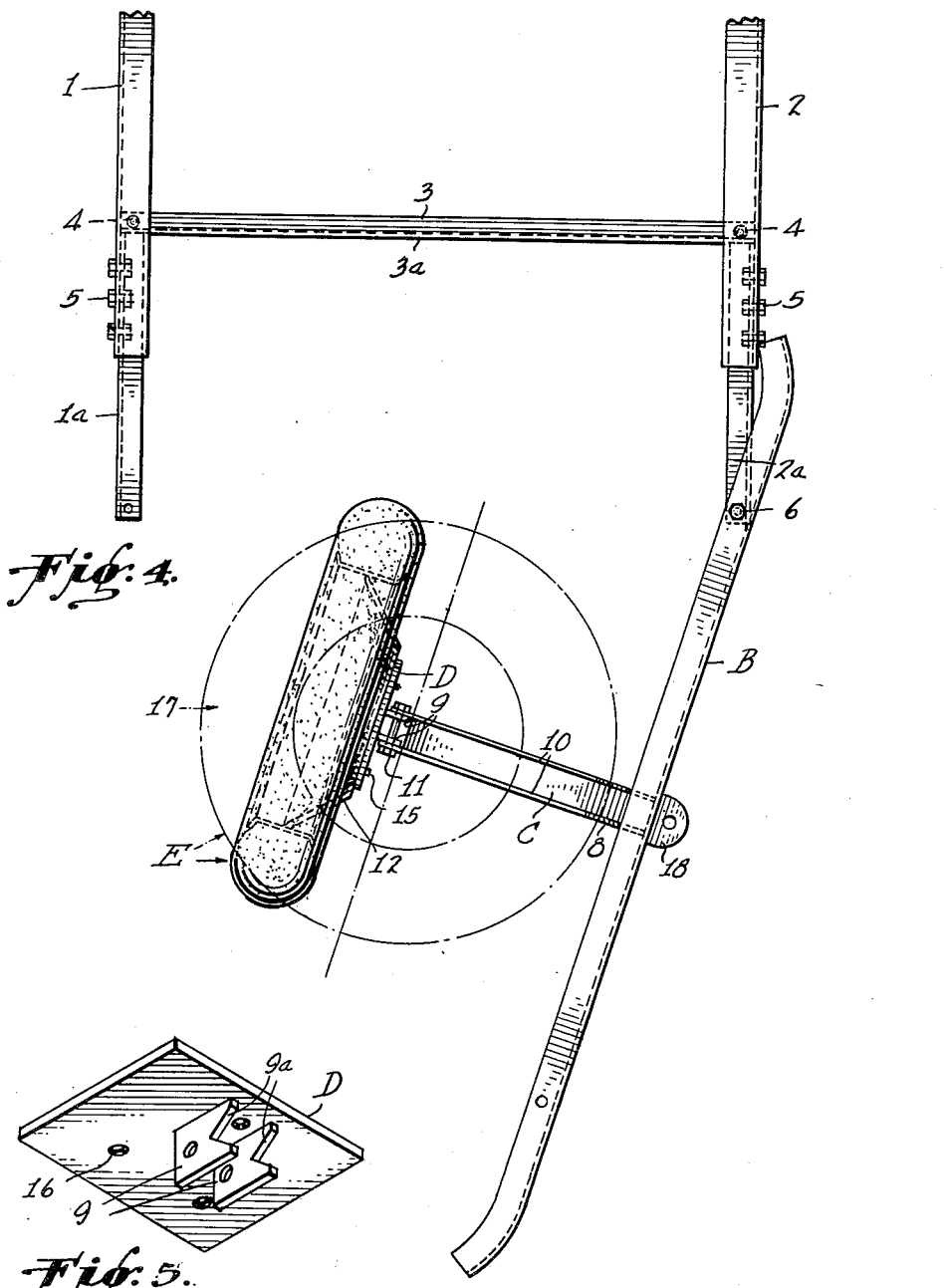
INVENTOR.
KENNETH C. CLARK
BY
Munn, Liddy & Glaccum
ATTORNEYS

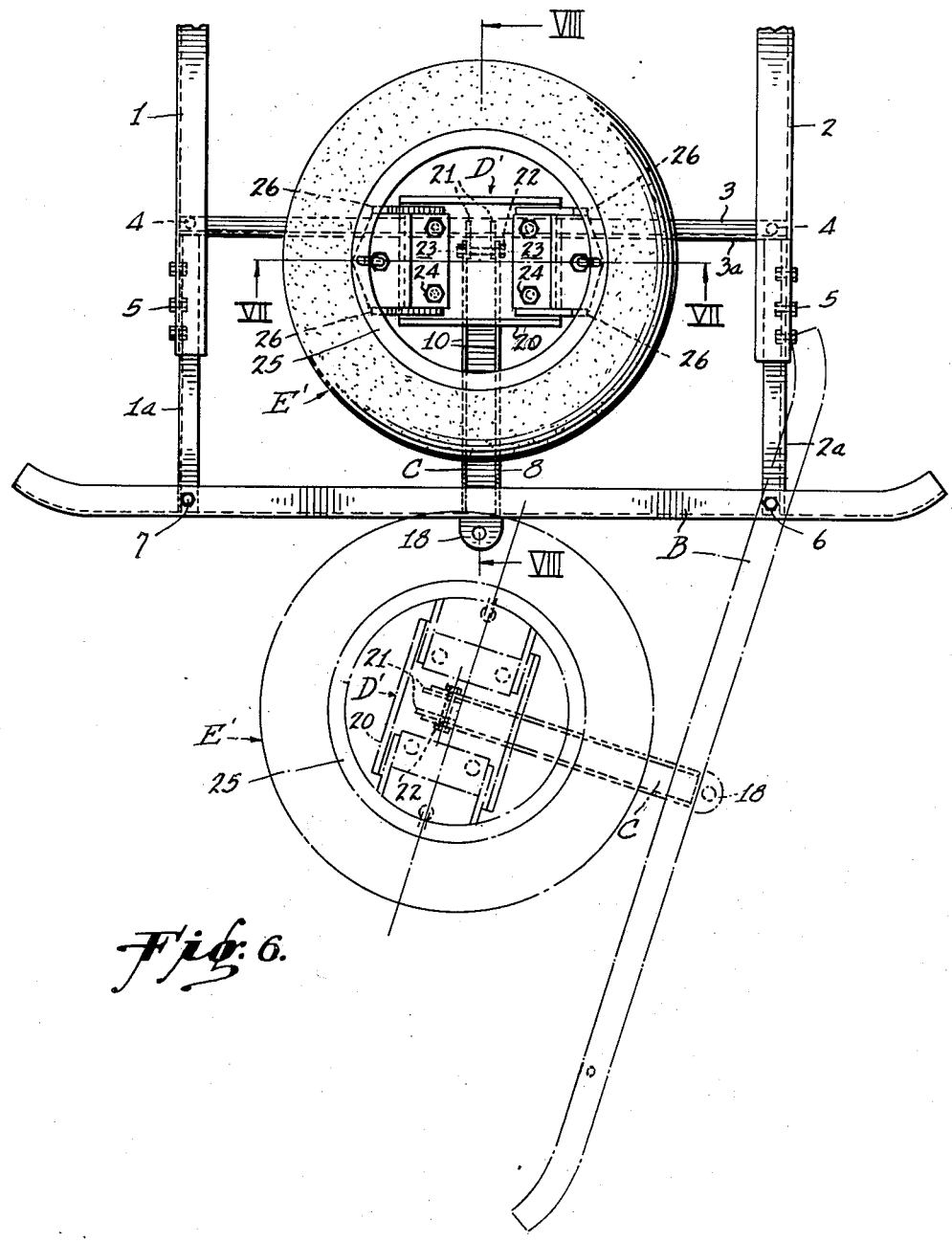

Nov. 13, 1951 K. C. CLARK 2,574,465
TIRE-WHEEL OR TIRE-RIM CARRIER FOR PICKUP TRUCKS
Filed Nov. 17, 1947 4 Sheets-Sheet 4
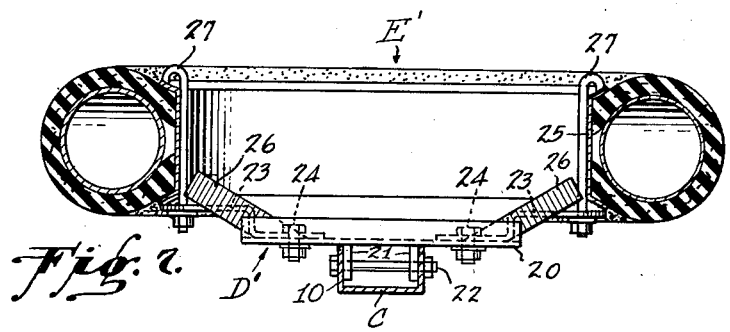
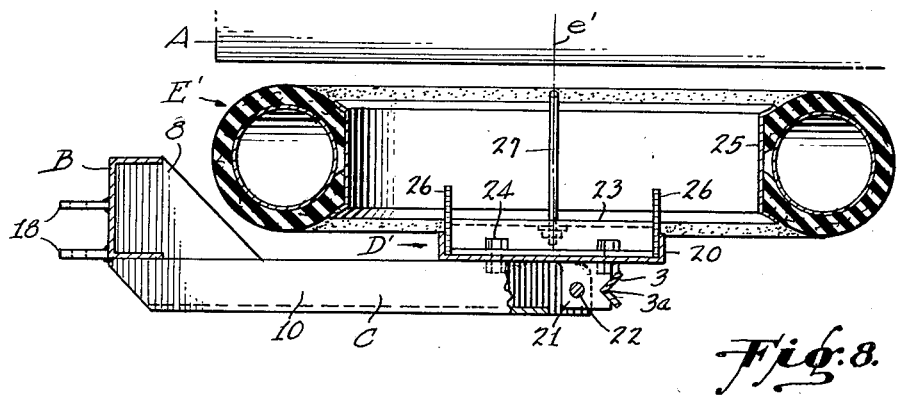
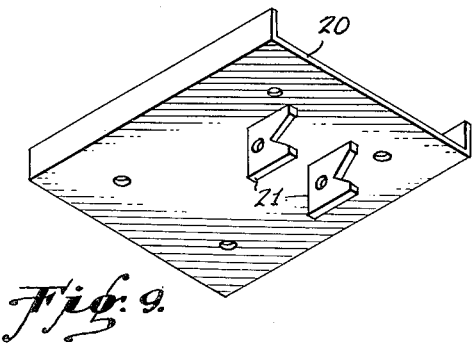
*INVENTOR.*
KENNETH C. CLARK
BY
Munn, Liddy & Glaccum
ATTORNEYS Patented Nov. 13, 1951

2,574,465

UNITED STATES PATENT OFFICE 2,574,465

TIRE-WHEEL OR TIRE-RIM CARRIER FOR PICKUP TRUCKS

Kenneth C. Clark, Watsonville, Calif.

Application November 17, 1947, Serial No. 786,476

11 Claims. (Cl. 224—42.22)

The present invention relates to improvements in a tire-wheel or tire-rim carrier for pick-up trucks. It consists of the combinations, constructions and arrangement of parts, as hereinafter described and claimed.

The invention pertains to that class of a carrier that is adapted for supporting a tire-wheel or a tire-rim assembly of a vehicle, such as a pick-up truck. The carrier normally supports the tire and its wheel or rim in an out-of-the-way position underneath the truck body. The carrier is withdrawable so as to fully expose the assembly, at which time the latter may be removed from the carrier. The reverse steps are taken when the assembly is to be positioned underneath the vehicle body.

An object of my invention is to provide a carrier that is designed to firmly support a tire-wheel or a tire-rim assembly underneath a vehicle body, and which may be operated with facility and ease for giving access to the assembly. The carrier is moved by means of a lever, which serves the additional function of a bumper for the vehicle.

A still further object is to provide a tiltable platform for holding the tire-wheel or tire-rim assembly, and I make use of means for retaining the platform against tilting when the latter is moved underneath the vehicle body.

Another object of my invention is to provide a carrier of the character described, which may be attached to a pick-up truck, or the like, without requiring any changes in the latter.

Other objects will appear as the specification proceeds, and the novel features will be set forth in the claims hereunto appended.

For a better understanding of my invention, reference should be had to the accompanying drawings, forming part of this application, in which:

Figure 1 is a top plan view of a portion of a vehicle chassis, illustrating my carrier by full lines when it occupies a position underneath the vehicle body, and showing the carrier by dot-dash lines after it has been withdrawn from under the body of the vehicle;

Figures 2 and 3 are vertical sectional views taken along the lines II—II and III—III, respectively, of Figure 1;

Figure 4 discloses the carrier arranged clear of the vehicle body and showing the carrier tilted to present the tire in a vertical position;

Figure 5 is an underneath isometric view of the tiltable platform used in Figures 1, 3 and 4;

Figure 6 is a view similar to Figure 1, but showing a modified form of a tiltable platform;

Figures 7 and 8 are vertical sectional views taken along the line VII—VII and VIII—VIII, respectively, of Figure 6; and Figure 9 is an underneath isometric view of the base plate forming part of the tiltable platform in Figures 6-8, inclusive.

While I have shown only the preferred forms of my invention, it should be understood that various changes, or modifications, may be made within the scope of the annexed claims without departing from the spirit thereof.

Referring to the drawings in detail, it will be noted that I show a pair of spaced-apart chassis frames 1 and 2, which are arranged beneath and support the body A of a vehicle in the conventional manner. A transverse bar 3 is secured to the chassis frames by bolts 4, or other suitable fastening means. In practice, I utilize a structural angle for the bar, with the angular edge 3a facing rearwardly of the vehicle for the reason described later.

Extension members 1a and 2a are secured to the chassis frames 1 and 2, respectively, by bolts 5 and extend rearwardly therebeyond. A lever B, which serves as a bumper for the vehicle, is swingably connected to the extension member 2a by a pivot bolt 6. When the bumper-lever occupies the full-line position shown in Figure 1, a retaining bolt 7 is employed for removably anchoring the lever B to the extension member 1a. Upon removal of the bolt 7, the lever B may be swung into the angular position suggested by the dot-dash lines.

An arm C is welded or otherwise fixed to the lever B so as to swing therewith. This arm is horizontally disposed, and may be fashioned from a structural channel. Gusset plates 8 are provided at the juncture of the lever B and arm C (see Figure 3) so as to reinforce the connection therebetween.

In Figures 1 and 3-5, inclusive, I disclose a tiltable platform designated generally at D. This platform has a pair of integral ears 9 on its underneath side, which are pivoted to the flanges 10 of the arm C by a horizontal bolt 11. Normally, this platform overlies the arm C, as in Figures 1 and 3. However, it is swingable about the bolt 11 into a vertical position, as shown in Figure 4, when the arm is withdrawn from between the chassis frames.

The ears 9 are notched, as at 9a, in order to receive the transverse bar 3 when the arm C occupies the full line position illustrated in Figure 1 (also see Figure 3). This will prevent the platform D from tilting, and at the same time the bar 3 will provide support for the free end of the arm. Upon withdrawing the arm C and platform D toward the dot-dash line position in Figure 1, the ears 9 are automatically disengaged from the bar 3, which will permit the platform to be tilted into vertical position.

The first embodiment of my invention shows a tire-wheel assembly E as being removably mounted on the platform D. The wheel 12 is of the disc-type and has a series of openings 14 provided in its hub portion. Bolts 15 are passed through these openings and are screwed into threaded openings 16 formed in the platform D (see Figures 3 and 5).

Having thus described the various parts of my carrier shown in Figures 1 to 5, inclusive, the operation thereof is briefly summarized as follows:

The tire-wheel assembly E normally occupies an out-of-the-way position underneath the body A of a vehicle, as shown in Figure 3. When the operator desires to have access to this assembly, the retaining bolt 7 is removed, and then the bumper-lever B is swung on its pivot 6 into the dot-dash line position illustrated in Figure 1. At this time the tire-wheel assembly is moved manually into a vertical position (see full lines in Figure 4) by tilting the platform D on the pivot bolt 11.

It should be noted that the axis e of the tire-wheel assembly is offset relative to the axis 11a of the pivot bolt 11 and toward the bumper-lever B (see Figure 3). This means that the tire-wheel assembly will maintain itself horizontally over the arm C until the side 17 of the tire-wheel assembly is depressed. Removal of the bolts 15 will free the tire-wheel assembly.

In mounting a tire-wheel assembly on the first embodiment of my invention, the wheel 12 is secured to the platform D by passing bolts 15 through the openings 14 in the wheel hub into the threaded openings 16 of the platform. Next, the tire-wheel assembly and platform are swung into horizontal position, and the lever B is moved into the full-line position shown in Figure 1. The retaining bolt 7 now is replaced to anchor the lever to the extension member 1a.

As the ears 9 approach the bar 3, the latter is received in the notches 9a of the ears. This will retain the platform D against tilting. The chassis frames 1—2, extension members 1a—2a, and bumper-lever B constitute a protective barrier around three sides of the tire-wheel assembly E when the latter is disposed underneath the body A of the vehicle.

The bumper B is provided with apertured lugs 18 for receiving the pintle pin of a vehicle to be towed (not shown). These lugs may be welded or otherwise fastened to the bumper.

Turning now to the second embodiment of my carrier, as disclosed in Figures 6 to 9, inclusive, it will be noted that the constructions of the chassis frames 1—2, extension members 1a—2a, bumper-lever B and arm C are all identical with the first form. Accordingly, like reference characters have been applied to corresponding parts.

The tiltable platform D' in the modification is identical with the platform shown in my co-pending application, Serial No. 712,451, filed in the United States Patent Office on November 26, 1946, now Patent No. 2,489,561, entitled "Tire-Wheel or Tire-Rim Assembly Carrier." The tire-rim assembly E' is removably mounted on this tiltable platform. This type of an assembly is used on an artillery wheel.

Briefly described, the tiltable platform D' includes a base plate 20, which is channel-shaped in transverse section. A pair of notched ears 21 are welded, or otherwise secured, to the base plate so as to extend therebelow so as to fit inside of the flanges 10 of the arm C. A horizontal bolt 22 passes through the ears 21 and the flanges of the arm. The axis $e'$ of the tire-rim assembly E' is offset with respect to the bolt 22 and toward the bumper B (see Figure 8).

A pair of substantially Z-shaped spacer plates 23 are attached to the base plate 20 by bolts 24, and these plates project underneath rim 25 of the assembly E' to support the latter. Guide bars 26 are welded to opposite sides of each spacer plate to extend upwardly and outwardly relative to the base plate. These guide bars reinforce the Z. When a disc wheel, as shown in Figure 3, is applied to the tiltable platform D', the bars 26 will guide the conical hub 12a of the disc wheel to a central position relative to the platform D'. A pair of J-shaped hooks 27 are provided for removably anchoring the tire-rim assembly E' (or a tire-disc wheel assembly) to the spacer plates 23.

Aside from the construction of the tiltable platform D', the second embodiment of my invention (Figures 6-9) is identical with the first form (Figures 1-5). No further description of the modification is considered necessary.

When tires having a diameter larger than the ones illustrated are to be mounted on my carriers, the arms C are arranged closer to the chassis frames 2. This will permit ample clearance between the tires and chassis frame 1 and allow the tire to be moved underneath the vehicle body or withdrawn from underneath the body.

I claim:

1. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm being movable into a position between the chassis frames, and also into a position extending beyond the latter; a tiltable platform pivotally secured to the arm, and being movable into a position overlying the arm and also into a vertical position; means for removably securing a tire-wheel or a tire-rim assembly to the platform; the tire-wheel being disposed within an area defined by spaced-apart frames and the lever when the latter is anchored to the other chassis frame; and means carried by the pair of spaced-apart chassis frames and engageable with the platform when the latter is positioned between the chassis frame for retaining the platform against tilting and constituting a support for the arm.

2. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm being movable into a position between the chassis frames, and also into a position extending beyond the latter; a tiltable platform pivotally secured to the arm, and being movable into a position overlying the arm and also into a vertical position; means for removably securing a tire-wheel or a tire-arm assembly to the platform; a bar secured to the chassis frames to extend transversely of the vehicle; and a notched ear fixed to the platform, and having its notch disposed to embrace the bar for holding the platform against tilting relative to the arm when the latter is positioned between the chassis frames.

3. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm being movable into a position between the chassis frames, and also into a position extending beyond the latter; a tiltable platform pivotally secured to the arm, and being movable into a position overlying the arm and also into a vertical position; and means for removably securing a tire-wheel or a tire-rim assembly to the platform; the chassis frames and lever providing a protecting barrier around three sides of the tire-wheel or tire-rim assembly when the assembly is positioned between the chassis frames.

4. The combination with a pair of spaced-apart chassis frames of a vehicle; of a lever swingably supported by the rear portion of one of the chassis frames for swinging movement in a substantially horizontal plane; means for removably anchoring the lever to the other chassis frame; a horizontally-disposed arm fixed to the lever so as to swing therewith and projecting forwardly therefrom; the arm being movable into a position between the chassis frames, and also into a position extending beyond the latter; means for removably mounting and securing a horizontally-disposed tire-wheel or tire-rim assembly on the arm; and means carried by the pair of spaced-apart chassis frames for supporting a free end of the arm when the latter is positioned between the chassis frames.

5. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm being movable into a position between the chassis frames, and also into a position extending beyond the latter; a platform fixed to the arm and having a notched ear projecting therefrom; a bar secured to the chassis frames to extend transversely of the vehicle; the notch of the ear being disposed to embrace the bar for supporting the platform when the arm is positioned between the chassis frames; and means for removably mounting and securing a tire-wheel or a tire-rim assembly to the platform.

6. In a carrier of the character described; a fixed bar; an arm mounted for movement toward and away from the bar; a tiltable platform pivotally secured to the arm, and being movable into a position overlying the arm and also into a vertical position; a notched ear fixed to the platform, and having its notch disposed to embrace the bar for holding the platform against tilting when the ear is engaged with the bar; and means for removably securing a tire-wheel or a tire-rim assembly to the platform.

7. In a carrier of the character described; a fixed bar; an arm mounted for movement toward and away from the bar; a platform secured to the arm; a notched ear fixed to the platform, and having its notch disposed to embrace the bar for supporting the platform when the ear is engaged with the bar; and means for removably securing a tire-wheel or a tire-rim assembly to the platform.

8. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm having a free end; the arm being movable into a position between the chassis frames, and also into a position extending beyond the latter; a platform secured to the arm; means for removably securing a tire-wheel or a tire-rim assembly to the platform; a bar secured to the chassis frames to extend transversely of the vehicle; and means to engage the bar for supporting the free end of the arm when the latter is positioned between the chassis frames.

9. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm having a free end; the arm being movable into a position between the chassis frames, and also into a position extending beyond the latter; a platform secured to the arm; means for removably securing a tire-wheel or a tire-rim assembly to the platform; a bar secured to the chassis frames to extend transversely of the vehicle; and means automatically connecting the free end of the arm to the bar to support the arm when the latter is positioned between the chassis frames.

10. The combination with a pair of spaced-apart chassis frames of a vehicle; of a lever swingably supported by one of the chassis frames for swinging movement in a substantially horizontal plane; means for removably anchoring the lever to the other chassis frame; a horizontally-disposed arm fixed to the lever so as to swing therewith; the arm being movable into a position between the chassis frame, and also into a position extending beyond the latter; a platform fixed to the arm; a bar secured to the chassis frames to extend transversely of the vehicle; means on the platform to automatically engage the bar for supporting the platform when the arm is positioned between the chassis frames; and means for removably mounting and securing a tire-wheel or a tire-rim assembly to the platform.

11. In a carrier of the character described; a pair of extension members adapted to be telescoped into a pair of chassis frames of a vehicle; means for securing the extension members to the chassis frames; a bar securable to the chassis frames to extend transversely therebetween; a lever swingably supported by one of the extension members for swinging in a substantially horizontal plane; means removably anchoring the lever to the other extension member; a horizontally-disposed arm fixed to the lever and projecting forwardly therefrom so as to swing therewith into a position between the chassis frames and extension members; the arm having a free end movable toward and away from the transverse bar; means for automatically interconnecting the free end of the arm with the bar when the arm is moved toward the bar; and means for removably securing a tire-wheel or a tire-rim assembly to the arm.

KENNETH C. CLARK.

REFERENCES CITED

The following references are of record in the file of this patent:

UNITED STATES PATENTS

| Number | Name | Date |
| --- | --- | --- |
| 1,953,953 | Carr | Apr. 10, 1934 |
| 2,131,746 | Morrison | Oct. 4, 1938 |
| 2,399,207 | Clark | Apr. 30, 1946 |

FOREIGN PATENTS

| Number | Country | Date |
| --- | --- | --- |
| 125,352 | Switzerland | Apr. 16, 1928 |
| 620,269 | France | Jan. 15, 1927 |